July 30, 1963 T. BUDZICH 3,099,218
CONSTANT HORSEPOWER PUMP
Filed May 4, 1962 2 Sheets-Sheet 1

INVENTOR.
TADEUSZ BUDZICH
BY
RICHEY, McNENNY & FARRINGTON
H. F. McNenny
ATTORNEYS July 30, 1963
T. BUDZICH
3,099,218
CONSTANT HORSEPOWER PUMP
Filed May 4, 1962
2 Sheets-Sheet 2
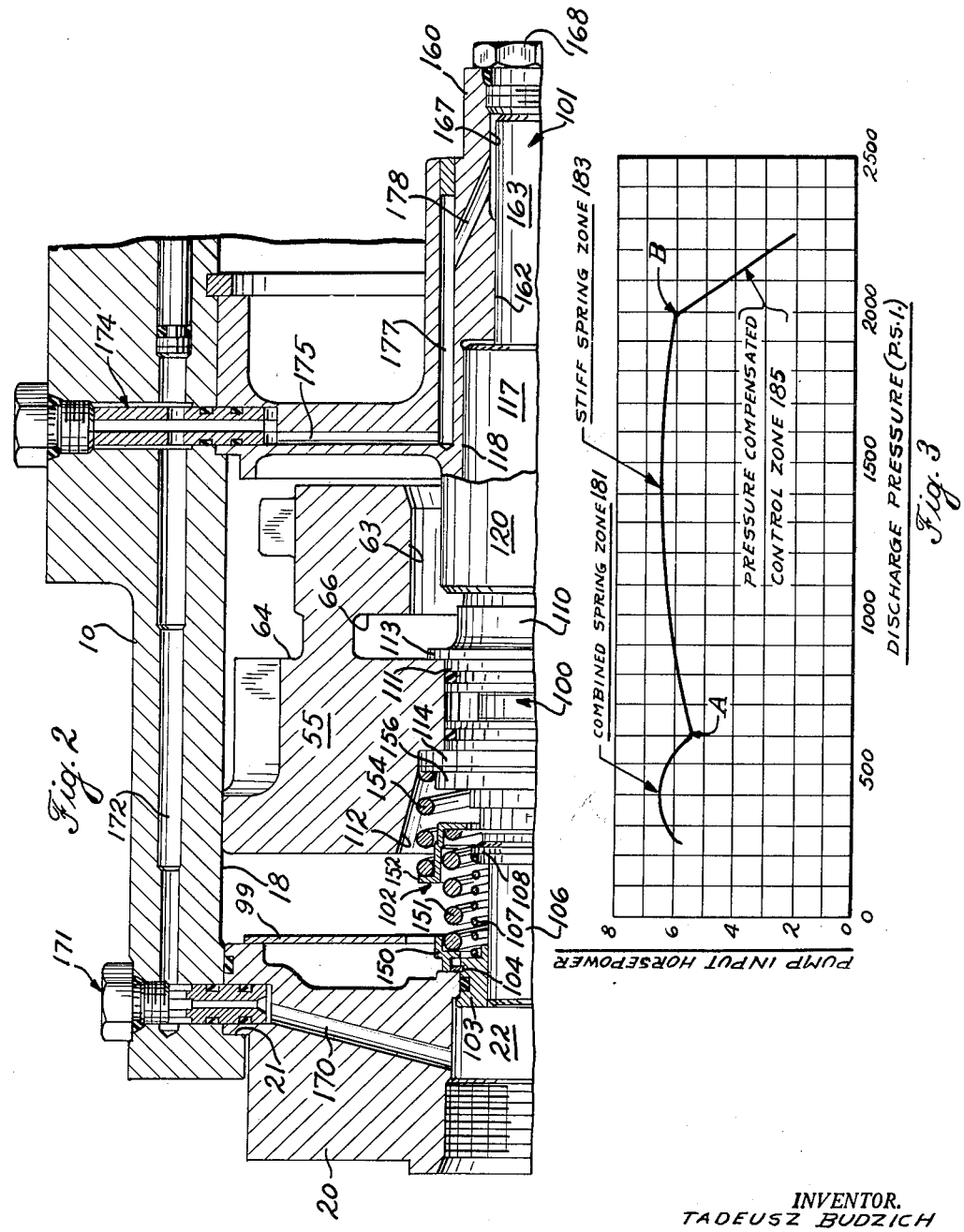
INVENTOR.
TADEUSZ BUDZICH
BY
RICHEY, McNENNY & FARRINGTON
ATTORNEYS United States Patent Office 3,099,218
Patented July 30, 1963

3,099,218
CONSTANT HORSEPOWER PUMP
Tadeusz Budzich, Shaker Heights, Ohio, assignor to The Weatherhead Company, Cleveland, Ohio, a corporation of Ohio
Filed May 4, 1962, Ser. No. 192,367
6 Claims. (Cl. 103—37)

This invention relates generally to variable displacement pumps and more particularly to controls for variable displacement pumps to provide a relatively constant power input with varying rates of output flow and varying output fluid pressure.

In certain applications of variable displacement pumps, such as in hydrostatic power transmission systems, it is desirable to have a control for the pump displacement which will regulate the pump in a manner to maintain the input horsepower from the driving source at a relatively constant level. For example, if a constant displacement hydraulic motor is used for driving a vehicle and the variable displacement pump supplying fluid to the motor is driven by a power source which runs most efficiently at a constant load and speed such as a diesel engine, the acceleration of the vehicle from a start will require a pump capacity directly proportional to the vehicle speed. Since the hydraulic horsepower transmitted by the pump is the function of the rate of fluid flow and the pressure, the most efficient operation of the transmission at constant horsepower will require that the pressure delivered by the pump vary inversely with the output volume. Since under constant horsepower conditions the pressure and volume are interdependent, either can be used to control the other to maintain a constant horsepower level.

However, when the input power to a variable displacement pump is maintained at a constant level, the output pressure of the pump and the output volume do not maintain a precise inverse relationship because of variations in the efficiency of the pump. For example, there is a greater amount of internal leakage and greater internal friction at higher pressures, while at a given pressure there may be a certain amount of leakage which is independent of the pump displacement. Furthermore, since the pressure and displacement vary inversely, they are non-linear functions and require a non-linear control for accuracy.

It is therefore the principal object of this invention to provide a novel and precise control for varying the output volume of an axial piston pump to maintain the input power of the driving motor to the pump at a substantially constant level during changes of the output volume and pressure.

Another object of this invention is to provide a control as set forth in the preceding object which is responsive to and operable by the pressure level at the output of the pump.

Another object of this invention is to provide a control as set forth in the preceding objects employing springs having linear rate in a non-linear combination to compensate for the non-linear variations and relationship between the pressure and the displacement at constant horsepower levels.

Another object of this invention is to provide a control as set forth in the preceding objects which compensates for varying hydraulic and mechanical efficiencies of the pump at varying displacement levels over the operating range of the pump.

Another object of this invention is to provide a control for a pump as set forth in the preceding objects which positively prevents overloading of the driving power source at low displacement levels where relatively high pressures are required to maintain the constant power level.

Still another object of this invention is to provide a control for an axial piston pump as set forth in the preceding objects which has a minimum of friction, rapid response to transient changes and high stability while maintaining simple construction which lends itself to low cost of manufacture.

Further objects and advantages of this invention will become apparent to those skilled in the art upon a more complete understanding of the preferred embodiment of this invention as shown in the accompanying drawings and described hereinafter in the detailed description.

In the drawings:

FIGURE 2 is an enlarged fragmentary cross-sectional view taken along line 2—2 of FIGURE 1; and FIGURE 3 is a graph showing the relationship between the pump input horsepower and the discharge pressure of the pump.

Figure 1:
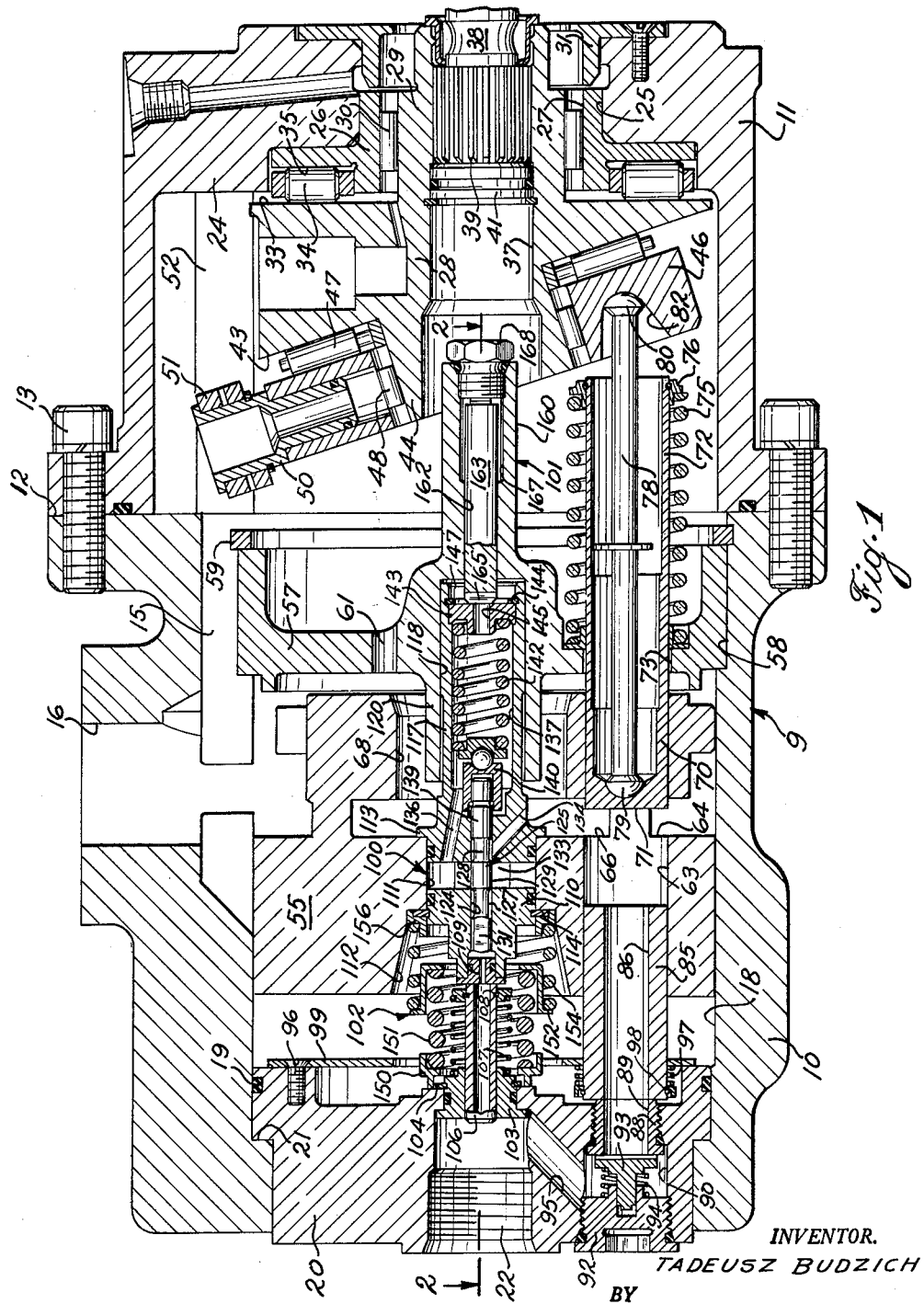
FIGURE 1 is a longitudinal cross-sectional view through a pump incorporating the control of the present invention.

The pump shown in FIGURE 1 includes many of the structural features of the pumps disclosed in co-pending applications by the same inventor, Serial No. 825,005 filed July 6, 1959, Serial No. 847,512 filed October 20, 1959, and Serial No. 88,142 filed February 9, 1961. The pump has a pump housing 9 which is formed from a pair of generally cup-shaped housing members 10 and 11 which are joined together along a flanged joint 12 by means of suitable cap screws 13. The housing 9 encloses a fluid chamber 15 within which the pumping mechanism is located, and the chamber 15 is normally completely filled with hydraulic fluid which enters through an inlet 16. One housing member 10 has a cylindrical bore 18 at the end of which is fitted an outlet housing 20. Outlet housing 20 makes sealing contact of the bore 18 by an O-ring 19 and is held in place against an inturned flange 21 on housing member 10 by means of suitable screws (not shown). The pump outlet 22 is centrally located on the exposed face of outlet housing 20.

The other housing member 11 has an end wall 24 having an aperture 25 therein to receive a bearing support member 26. The bearing support member 26 has an axial bore 27 therethrough to receive the shank 29 of a drive member 28 which is journaled therein by roller bearings 30. A suitable oilseal 31 is provided on the outer end of the shank 29 to prevent fluid leakage out of the chamber 15. The drive member 28 has a radial face 33 which is journaled against a roller thrust bearing 34 positioned against a radial face 35 on the bearing member 26. Drive member 28 also has an axial bore 37 which receives an end of a stub drive shaft 38 by means of a splined connection indicated at 39. A suitable sealing plug indicated at 41 closes off bore 37 to prevent leakage of fluid within chamber 15 at this point.

Rotation of the stub drive shaft 38 by means of a suitable connection to a motor or other prime mover will rotate the drive member 28 which has an inclined face 43 from which projects a hub 44 normal to the inclined face 43. A wobble plate 46 is mounted on inclined face 43 and hub 44 by means of a roller thrust bearing 47 and radial roller bearing 48, respectively. The wobble plate 46 is prevented from rotating by means of a radially projecting stud 50, on the outer end of which is journaled a guide block 51. Guide block 51 fits within a longitudinal channel 52 in the housing member 11 for longitudinal sliding movement. Thus rotation of the drive member 28 causes the wobble plate 46 to oscillate with a sinusoidal motion without rotation within the pump housing.

A cylinder block 55 is journaled for axially sliding movement within the cylindrical bore 18 on the housing member 10 for reciprocating movement to and from the wobble plate 46 and is restrained from rotating by suitable guide means (not shown). Between cylinder block 55 and wobble plate 46, a web member 57 is fitted within a counterbore 58 in housing member 10 and retained in place by means of a suitable retainer ring 59. Passages 61 are formed in the web member 57 to allow free flow of fluid throughout the fluid chamber 15. The cylinder block 55 is provided with a plurality of cylinder bores 63, only one of which has been shown and will be described in detail. It is understood that the cylinder bores extend from end to end in cylinder block 55 and are spaced equidistantly about the longitudinal axis of the pump parallel thereto at the same radius. The cylinder bore 63 is provided with an outer inlet port 64 which opens into the cylinder port intermediate its ends. Fluid is also allowed to enter the cylinder bore 63 through an inner inlet port 66 radially opposite outer port 64 and connecting with an axial bore 68 in the cylinder block.

A piston 70 is fitted within the end of cylinder bore 63 adjacent the wobble plate 46, and has a head portion 71 adjacent the inlet ports 64 and 66 when the piston is in the retracted position and the cylinder block is in the position shown in FIGURE 1. Piston 70 has a tubular skirt portion 72 which extends through an opening 73 in web member 57 toward the wobble plate 46. A helical compression spring 75 is fitted around tubular skirt portion 72 to abut at the one end against the web member 57 and at the other end against a retainer ring 76 carried on the end of tubular skirt 72. The piston 70 is reciprocated by the wobble plate 46 by means of an interconnecting push rod 78. A ball portion 79 at the one end of push rod 78 bears against the underside of the piston head 71, while another ball portion 80 on the other end of push rod 78 is received within a cup-like recess 82 on the exposed face of wobble plate 46. Thus, the action of the inclined face 43 on the drive member 28 shifts the wobble plate 46 forward to force the piston 70 into the cylinder bore, while the force of the compression spring 75 serves to retract the piston when the wobble plate is shifted to the position shown in FIGURE 1.

A tubular reaction piston 85 having a longitudinal bore 86 is fitted within the other end of cylinder bore 63 opposite the piston 70. The exposed end of reaction piston 85 abuts against a port member 88 having a bore 89 in alignment with the reaction piston bore 86, and port member 88 is fitted within a recess 90 in the outlet housing 20 in axial alignment with the cylinder bores 63. The outer end of recess 90 is closed off by a suitable plug 92 which serves as an abutment or support for one end of the light compression spring 94 which biases a check valve plunger 93 against the port member 88 to close off the bore 89 from the recess 90. A passage 95 leads from the recess 90 to the pump outlet at 22. Although the pumping pressure within the cylinder 63 acting on the effective cross-sectional area of the reaction piston 85 will hold the latter in sealing contact with the port member 88, a positive seal is necessary for starting to insure that there will be an initial pressure built up within the cylinder to bias the reaction piston into abutting face to face sealing contact with the port member 88. This biasing force is provided by a compression spring 97 which abuts at one end against a snap ring 98 attached to the outer periphery of the reaction piston adjacent the port member 90. The other end of compression spring 97 abuts against a retainer plate 99 which is secured to the inner face of outlet housing 20 by means of suitable screws 96.

The effective output volume of the pump is varied by what is known as spill control by positioning the inlet ports 64 and 66 relative to the stroke of the pumping piston 70. Since ports 64 and 66 are formed directly in cylinder block 55, axial sliding movement of the cylinder block between the outlet housing 20 and the web member 57 serves to vary the position of the inlet ports. It will be understood that when the cylinder block 55 is in the position shown in FIGURE 1 adjacent web member 57 the output volume will be at a maximum, since the piston 70 covers the ports 64 and 66 at the initial portion of the pumping or forward stroke. When the cylinder block is positioned adjacent the outlet housing 20, the ports 64 and 66 are closed off, if at all, only at the end of the stroke, so that the action of the piston 70 merely serves to pump fluid in and out of the cylinder bores through the ports 64 and 66.

The position of cylinder block 55 is determined by the operation of the pressure compensated control and motor indicated generally at 100 and the constant horsepower control motor indicated generally at 101, both of which move the cylinder block 55 toward the outlet housing 20 in opposition to the biasing force provided by the spring assembly 102.

The pressure compensated control 100 is carried in the cylinder block 55 and is operated by fluid at outlet pressure communicated to the pressure compensated valve from the pump outlet 22. To accomplish this, a plug 103 is fitted in the outlet housing 20 between the outlet 22 and the fluid chamber 15 and held in place by a snap ring 104. A transfer tube 106 is slidably fitted within a bore in plug 103 and extends toward the cylinder block 55 where it makes abutting sealing contact with an apertured fitting 109 carried in the end of the pressure compensated control valve body 110. A relatively light spring 107 surrounds the transfer tube 106 to abut at the one end against plug 103 and at the other end against a snap ring 108 on transfer tube 106 to bias the latter into sealing contact with apertured fitting 109 at all times. The valve body 110 is fitted within an axial bore 111 in the cylinder block 55, and bore 111 at the one end opens into the enlarged cylindrical bore 63 adjacent the inlet port 66 and at the other end into a conical counterbore 112 facing the outlet housing 20. Valve body 110 is held in place within the axial bore 111 by means of a shoulder 113 and a snap ring 114 within counterbore 112. At the one end, valve body 110 has a cylindrical projection 117 extending toward the web member 57 where it fits within a cylinder 118 within an enlarged central boss 120 on web member 57.

The valve body 110 is provided with an axial bore 124 extending therethrough and communicating with the apertured fitting 109. A valve spool 125 is slidably fitted within axial bore 124 and at its central portion is provided with a pair of annular grooves 127 and 128 which define a land 129 between them. The outer end of valve spool 125 is provided with a guide portion 131 having flats or slots thereon so that the outer annular groove 127 is always connected with fluid at outlet pressure through the apertured fitting 109 and transfer tube 106. The valve body 110 has an annular port 133 positioned to be in radial alignment with the land portion 129 when the valve spool is in the neutral position as shown in FIGURE 1. A drain passage 134 opens into the axial bore 124 adjacent the inner annular groove 128 and is connneced to the fluid chamber 15 so that the inner annular groove 128 is always connected to the low pressure of the fluid chamber 15. A passage 136 extends between the annular port 133 and a cylindrical chamber 137 formed within the cylindrical projection 117 of the valve body. One end 139 of valve spool 125 extends into the chamber 137 where it engages one end of a spring abutment assembly 140. A helical compression type control spring 142 is located within chamber 137 and abuts at the one end on the spring abutment assembly 140 and at the other end against a plug 143 secured within chamber 137 by a snap ring 144. Plug 143 is provided with an aperture at 145 to permit communication of fluid between the chamber 137 and the motor chamber 147 formed by the cylindrical projection 117 and the cylinder 118.

The spring assembly 102 which biases a cylinder block 55 toward the web member 57 and cooperates with both the constant horsepower motor 101 and the pressure compensated control 100 is positioned between the outlet housing 20 and cylinder block 55. The spring assembly 102 includes a fixed spring retainer 150 which fits against the inner face of outlet housing 20 adjacent the plug 103 and serves as an abutment for one end of a heavy or stiff spring 151. Spring 151 abuts at the other end against an intermediate spring guide 152 which also serves as the abutment for a lighter spring 154 which abuts against another spring retainer 156 fitted within the counterbore 112 on the cylinder block 55 adjacent the pressure compensated control valve body 110. Thus the springs 151 and 154 are mounted to act in series and because they have different spring rates, they bias the cylinder block 55 toward the web member 57 with a force which is non-linear over the full range of cylinder block movement, as will be described in greater detail hereinafter.

The constant horsepower control motor 101 is carried on the web member 57 and includes an axial projection 160 which projects from the boss 120 on web member 57 toward the wobble plate 46 and drive member 28, so that it extends into the central bore 37 in the drive member. Projection 160 has an axial bore 162 therein which opens at one end into the cylinder 118. A piston 163 is fitted within bore 162 and has an end adapted to rest against the plug 143. The end of piston 163 is provided with a slot at 165 so as to permit free passage of fluid between the aperture 145 and motor chamber 147 while permitting the piston 163 to bear firmly against the abutment plug 143 so as to shift the valve body 110 and cylinder block 55 toward the outlet housing 20 when force is applied to the other end of piston 163. At the other end of bore 162, projection 160 is provided with an enlarged counterbore 167 which is closed off at its outer end by a suitable plug 168. Counterbore 167 serves as a chamber to permit the fluid pressure therein to act on the end of piston 163.

To permit fluid to flow from the pump outlet 22 to the counterbore 167, a system of passages is provided to permit fluid communication between these points at all times so that the counterbore 167 is always at the same pressure level as the pump outlet 22. To this end, a radial passage 170 is provided in the outlet housing 20 to extend outward from the pump outlet 22 to a fitting assembly 171 which permits the fluid in passage 170 to be communicated to an axial passage 172 in the left pump housing member 10. At the other end of passage 172, another fitting assembly 174 connects the passage 172 to a radial passage 175 extending inward through the web member 57. At its inner end, radial passage 175 communicates with an axial passage 177 in the projection 160, and its other end axial passage 177 in turn opens into an oblique passage 178 communicating with the counterbore 167.

The operation of pressure compensated control 100 is described in considerable detail in the present inventor's copending applications Serial No. 847,512 and Serial No. 88,142 referred to above. However, briefly described, the operation of pressure compensated control 100 depends upon the valving action of the valve spool 125 as determined by its position within the axial bore 124 and hence the position of the land portion 129 relative to the annular port 133. The position of valve spool 125 is determined by the force of the outlet pressure communicated through the transfer tube 106 and aperture fitting 109 and acting on the cross-sectional area of valve spool 125 to bias the valve spool 125 toward the right as seen in FIGURE 1. This force is opposed by the combined forces exerted by the compression spring 142 acting through the spring abutment assembly 140 on the inner end of 139 of valve spool 125, and by the force exerted by the fluid pressure within chamber 137 on the cross-sectional area of the valve spool 125. The pressure within the chamber 137 and the motor chamber 147 will be determined by the force required to balance the force exerted by the spring assembly 102 to determine a stable position of the cylinder block 55, except to the extent the force of the spring assembly 102 is also counterbalanced by the force of the outlet pressure acting through the piston 162 to bias the cylinder block 55 against spring assembly 102. The fluid pressure level within motor chamber 147 is relatively small and most of the biasing force acting on the valve spool 125 to oppose the outlet pressure will be that produced by the compression spring 142.

When the pump outlet 22 is at relatively low pressure, the force of compression spring 142 will shift the valve spool 125 toward the left as seen in FIGURE 1 so that the chamber 137 is connected through passage 136 and annular port 133 to the inner annular groove 128 and hence through the drain passage 134 to the fluid chamber 15. This insures that there will be substantially no fluid pressure within the chamber 137 and the force of the spring assembly 102 will hold the cylinder block 55 in a position adjacent the web member 57, which is the maximum output displacement position. If the fluid pressure within the pump outlet 22 exceeds the level determined by the spring rate and preload of the control spring 142, this pressure acting on the exposed end of valve spool 125 will shift the latter to the right as shown in FIGURE 1 so as to permit the high pressure fluid at the outer annular groove 127 to be admitted through the annular port 133 and passage 136 to the fluid chamber 137. From there the fluid flows through the aperture 145 in plug 143 past the slotted end 165 of piston 163 into the motor chamber 147 to act on the effective cross-sectional area of the cylindrical projection 117 to compress the spring assembly 102 and shift the cylinder block 155 toward the outlet housing 20 to reduce the effective displacement of the pump. When the pressure in the pump outlet 22 corresponds to the level just below that at which the pressure compensated valve 100 acts to reduce the output displacement of the pump responsive to excessive pressure, the valve spool 125 will be in the position shown in FIGURE 1 in which the land portion 129 completely blocks off the annular port 133 and prevents any fluid flow to and from the chambers 137 and 147.

At all times there will be a biasing force exerted on the cylinder block 55 in the direction to compress the spring assembly 102 because of the action of the constant horsepower motor assembly 101. Since, as previously stated, the piston 163 is always exposed to the pressure in the pump outlet 22, it will always exert upon the cylinder block 55 a biasing force tending to reduce the output displacement which is directly proportional to the outlet pressure. The movement and position of the cylinder block 55 under these conditions is determined by the springs 151 and 154 in the spring assembly 102 which provides a non-linear biasing force on the cylinder block. The term non-linear is used because the springs have a low effective rate during initial compression and a higher or stiffer rate after the light spring 154 becomes inoperative when the intermediate guide 152 contacts retainer 156. The operation of spring assembly 102 can be understood more easily from the graph of FIGURE 3 which shows the performance characteristics of a pump designed for an input of six horsepower and a maximum discharge pressure of 2000 p.s.i.

The springs 151 and 154 are given an initial preload which prevents any movement of the cylinder block under the action of piston 163 below an outlet pressure level of approximately 250 p.s.i. in the example shown. When the outlet pressure exceeds this level, the spring assembly 102 will start to compress to allow the cylinder block 55 to move gradually toward the outlet housing 20 to reduce the output displacement of the pump. From this point up to the point indicated at A where the outlet pressure is 600 p.s.i., the action of the piston 163 will be resisted by both of the springs 151 and 154, and since each of these springs is free to compress in the combined spring zone indicated at 181 on FIGURE 3, the force resisting the action of piston 163 is lower than the spring rate of either spring alone. In this zone the input horsepower rises to a maximum of slightly over six and then falls to approximately five and one half at point A, where the light spring 154, with a much lower rate than that of spring 151, has compressed a greater distance, so that the intermediate spring guide 152 moves into abutting contact with spring retainer 156 and no further compression of the light spring 154 is possible. The movement of the cylinder block 55 is now opposed only by the action of the heavier spring 151. Further increases in the outlet pressure in the range between 600 p.s.i. and 2000 p.s.i. will cause the heavy spring 151 to compress further to gradually reduce the outlet displacement of the pump with increasing outlet pressure to maintain the pump input horsepower at a substantially constant level. When the outlet pressure reaches the limit indicated at point B of 2000 p.s.i., the pressure compensated control 100 will then come into operation to shift the cylinder block toward the zero output displacement position to prevent any further increase in the outlet pressure by reducing the output displacement in response to any increase in pressure above the maximum level of 2000 p.s.i.

It is also contemplated that both of the springs 151 and 154 can be replaced by a variable rate or non-linear spring having the same effective biasing force on the cylinder block. Also, more than two springs can be used with additional intermediate spring guides, and these springs will have different spring rates and will reach full compression at different positions of the cylinder block.

The effective pressure acting to compress the spring assembly 102 consists of the difference betwene outlet pressure acting upon the cross-sectional area of piston 163 and the force exerted by the outlet pressure acting on the effective area of the transfer tube 106. For example, if the transfer tube 106 and piston 163 have the same diameter, the effective force exerted by the piston 153 will be equal to the area of the bore through the transfer tube 106. This arrangement allows the use of a relatively large diameter stiff piston rod 163 producing a force considerably less than determined by the cross-sectional area of the piston 163. As a result, the springs in spring assembly 102 may be relatively light to give fast response under transient conditions.

As previously stated, both of the springs 151 and 154 are given an initial preload when the cylinder block 55 is in the maximum displacement condition so that no movement of the cylinder block takes place before the outlet pressures reaches a predetermined level which in the example is 250 p.s.i. This is necessary because the output volume required to maintain constant input horsepower at low discharge pressures exceeds the capacity of the pump. Since the preload applied to these springs determines the point at which they will begin to compress, this preload determines the maximum horsepower which is required to drive the pump when it is at the maximum displacement position. Likewise, the rate of the heavy spring 151 must be selected to bring point B to the proper power level before the pressure compensated control becomes effective to insure that this maximum pressure at point B is at the full pump input horsepower. The ratios of the spring rates of the two springs 151 and 154 determines the position of point A at which the one spring is completely compressed, and this ratio is normally selected so that the curve in both the combined spring zone 181 and the stiff spring zone 183 lies as close as possible to six input horsepower. Since the curve shown in FIGURE 3 is matched to pump input horsepower, it is not dependent upon the pump outlet horsepower which is a direct function of both the discharge pressure and the outlet volume. Therefore, the constant horsepower control automatically compensates for the varying efficiency of the pump throughout the full range of outlet pressure and displacement.

While the preferred embodiment of this invention has been shown and described in considerable detail, it is recognized that the invention is not limited to the specific form shown and described and various modifications and rearrangements may be made by those skilled in the art without departing from the scope of the invention as defined in the following claims.

What is claimed is:

1. A variable displacement pump having a pump housing defining a fluid chamber therein, an inlet to said fluid chamber and an outlet on said pump housing, a cylinder block slidably mounted within said fluid chamber for axial reciprocating movement between minimum and maximum displacement positions, a plurality of cylinder bores in said cylinder block, a piston within each of said cylinder bores, drive means to reciprocate said pistons, an inlet port in said cylinder block adapted to admit fluid from said fluid chamber into said cylinder bores, means to connect each of said cylinder bores to said pump outlet, first means biasing said cylinder block toward the minimum displacement position with a force directly proportional to the pressure at said outlet, second means biasing said cylinder block toward the maximum displacement position in opposition to the force of said first means with a force non-linear with respect to the position of said movable member to maintain a constant power level during variations of the pump output displacement and pressure, and pressure responsive control means including a fluid pressure motor operating to oppose said second means to shift said movable member to the minimum displacement position whenever the output pressure of the pump exceeds a predetermined level.

2. A variable displacement pump having a pump housing defining a fluid chamber therein, an inlet to said fluid chamber, an outlet on said pump housing, a cylinder block slidably mounted within said fluid chamber for axial reciprocating movement between minimum and maximum displacement positions, a plurality of axially extending cylinder bores in said cylinder block, a piston within each of said cylinder bores, drive means to reciprocate said pistons, inlet port means in said cylinder block to admit fluid from said fluid chamber into said cylinder bores, means connecting each of said cylinder bores to said outlet, a first expansible chamber fluid motor connected to said pump outlet and adapted to bias said cylinder block toward the minimum displacement position with a force directly proportional to the output pressure of the pump, non-linear spring means biasing said cylinder block toward the maximum displacement position in opposition to the force of said expansible chamber fluid motor to maintain a constant power level during variations in the pump output displacement and pressure, and pressure responsive control means including a second expansible chamber fluid motor adapted to shift said cylinder block toward the minimum displacement position in opposition to the force of said non-linear spring means whenever the pressure in said outlet exceeds a predetermined level.

3. A variable displacement pump having a pump housing defining a fluid chamber therein, an inlet to said fluid chamber, an outlet on said pump housing, a cylinder block slidably mounted within said fluid chamber for axial reciprocating movement between minimum and maximum displacement positions, a plurality of axially extending cylinder bores in said cylinder block, a piston within each of said cylinder bores, drive means to reciprocate said pistons, inlet port means in said cylinder block to admit fluid from said fluid chamber into said cylinder bores, means connecting each of said cylinder bores to said outlet, a first expansible chamber fluid motor in said pump housing in axial alignment with said cylinder block and connected directly to said pump outlet, said motor having a movable piston member adapted to engage said cylinder block and bias it toward the minimum displacement position with a force directly proportional to the output pressure of the pump, non-linear spring means interposed between said pump housing and said cylinder block to bias said cylinder block toward the maximum displacement position in opposition to the force of said expansible chamber fluid motor to maintain a constant power level during variations in the pump output displacement and pressure, and pressure responsive control means including a second expansible chamber fluid motor adapted to shift said cylinder block toward the minimum displacement position in opposition to the force of said non-linear spring means whenever the pressure in said outlet exceeds a predetermined level.

4. A variable displacement pump having a pump housing defining a fluid chamber therein, an inlet to said fluid chamber and an outlet on said pump housing, a cylinder block slidably mounted within said fluid chamber for axial sliding movement between minimum and maximum displacement positions, a plurality of cylinder bores in said cylinder block, a piston in each of said cylinder bores, drive means for reciprocating said pistons, inlet port means on said cylinder block to admit fluid from said fluid chamber into said cylinder bores, means connecting each of said cylinder bores to said pump outlet, a first expansible chamber fluid motor comprising a cylinder carried by said pump housing and a piston member carried by said cylinder block, valve means carried by said cylinder block, means connecting said valve means to said pump outlet, said valve means being operable to admit fluid from said outlet to said first motor whenever the pressure in said outlet exceeds a predetermined level to shift said cylinder block toward the minimum displacement position and to exhaust fluid from said motor whenever the pressure in said outlet is below said predetermined level, non-linear spring means interposed between said pump housing and said cylinder block to bias said cylinder block toward the maximum displacement position in opposition to the force of said first motor, a second expansible chamber fluid motor in said pump housing in axial alignment with said first motor, said second motor being connected directly to said pump outlet, said second motor having a movable piston member adapted to engage said first piston member to bias said cylinder block toward the minimum displacement position with a force directly proportional to the pressure in said pump outlet to maintain a constant power level during variations in the pump output displacement and pressure when said pressure is below said predetermined level.

5. A variable displacement pump having a pump housing defining a fluid chamber therein, an inlet to said fluid chamber and an outlet centrally located on said pump housing, a cylinder block slidably mounted within said fluid chamber for axial sliding movement between minimum and maximum displacement positions, a plurality of cylinder bores in said cylinder block, a piston in each of said cylinder bores, drive means for reciprocating said pistons, inlet port means on said cylinder block to admit fluid from said fluid chamber into said cylinder bores, means connecting each of said cylinder bores to said pump outlet, a first expansible chamber fluid motor comprising a cylinder carried by said pump housing and a piston member carried by said cylinder block, valve means carried by said cylinder block, a transfer tube slidably journaled in said pump housing to conduct fluid from said outlet to said valve means, said transfer tube having an effective cross-sectional area exposed to said outlet to exert a biasing force on said cylinder block proportional to the pressure in said outlet in opposition to said first motor, said valve means being operable to admit fluid from said outlet to said first motor whenever the pressure in said outlet exceeds a predetermined level to shift said cylinder block toward the minimum displacement position and to exhaust fluid from said motor whenever the pressure in said outlet is below said predetermined level, non-linear spring means interposed between said pump housing and said cylinder block to bias said cylinder block toward the maximum displacement position in opposition to the force of said first motor, a second expansible chamber fluid motor in said pump housing in axial alignment with said first motor, said second motor being connected directly to said pump outlet, said second motor having a movable piston member adapted to engage said first piston member to bias said cylinder block toward the minimum displacement position with a force directly proportional to the pressure in said pump outlet to maintain a constant power level during variations in the pump output displacement and pressure when said pressure is below said predetermined level.

6. A variable displacement pump having a pump housing defining a fluid chamber therein, said pump housing having an end wall, an inlet to said fluid chamber and an outlet on said pump housing, a cylinder block slidably mounted within said fluid chamber for axial sliding movement to and from said end wall between minimum and maximum displacement positions, a plurality of cylinder bores in said cylinder block, a piston in each of said cylinder bores, drive means for reciprocating said pistons, inlet port means on said cylinder block to admit fluid from said fluid chamber into said cylinder bores, means connecting each of said cylinder bores to said outlet, an expansible chamber fluid motor in said pump housing in axial alignment with said cylinder block and connected directly to said outlet, said motor having a movable piston member adapted to engage said cylinder block on the side away from said end wall and bias it toward the minimum displacement position adjacent said end wall with a force directly proportional to the pressure in said outlet, a fixed spring abutment on said end wall in said fluid chamber, a fixed spring abutment on said cylinder block, a first helical compression spring having one end in engagement with said end wall abutment, a second helical spring having one end in engagement with said cylinder block abutment, a floating abutment member intermediate said springs and engaging the other ends of said springs, said springs being adapted to provide a non-linear force opposing the biasing force of said fluid motor, said springs being constructed and arranged to provide a first biasing force by compression of both of said springs in series during movement of said cylinder block from the maximum displacement to an intermediate displacement position, one of said springs being arranged to collapse and allow said floating abutment to engage the adjacent fixed abutment in said intermediate position whereby the other of said springs provides an increased biasing force during further movement of said cylinder block from said intermediate displacement position to the minimum displacement position, whereby said springs provide a non-linear biasing force to maintain a constant power level during variations in the pump output displacement and pressure.

References Cited in the file of this patent

UNITED STATES PATENTS

| | | |
|---|---|---|
| 2,562,615 | Huber | July 31, 1951 |
| 2,778,314 | Siver | Jan. 22, 1957 |
| 2,982,216 | Huber | May 2, 1961 |
| 2,990,781 | Tuck et al. | July 4, 1961 |
| 3,016,018 | Williams | Jan. 9, 1962 |
| 3,020,847 | Rohrberg | Feb. 13, 1962 |
| 3,051,092 | Lambeck | Aug. 28, 1962 |